United States Patent Office 3,554,710
Patented Jan. 12, 1971

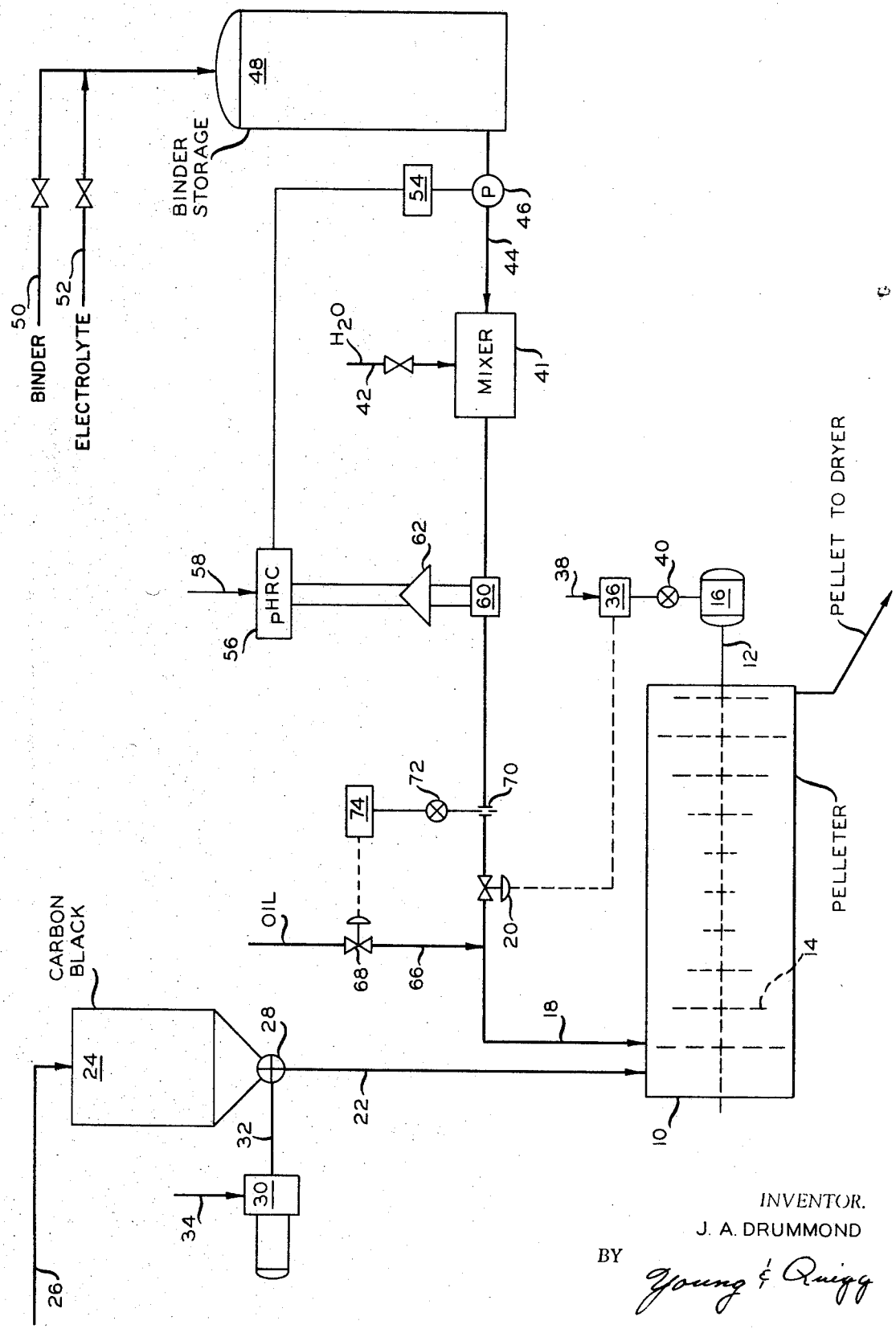

3,554,710
APPARATUS AND PROCESS FOR CONTROLLING FLOW OF MIXED LIQUIDS TO A WET PELLETING PROCESS BY pH CONTROL
John A. Drummond, Borger, Tex., assignor to Phillips Petroleum Company, a corporation of Delaware
Filed July 13, 1967, Ser. No. 653,205
Int. Cl. C01b 31/14
U.S. Cl. 23—314                             6 Claims

ABSTRACT OF THE DISCLOSURE

In pelleting flocculent carbon black with water containing a liquid, water-miscible binder wherein the flow rate of water varies somewhat to compensate for unavoidable variations in the flow rate of black to a wet pelleter, the concentration of binder in the water stream is controlled by adding an electrolyte (either a base or acid) in minor but effective concentration to the binder to form a homogeneous mixture, injecting the resulting mixture into the water stream, sensing the value of the pH or hydrogen ion concentration of the resulting aqueous stream, and regulating the injection rate of the binder in response to the sensed value to maintain said value relatively constant. Oil is also added to the aqueous stream fed to the pelleter by sensing the rate of flow of the aqueous stram and controlling the flow of oil in response to the sensed flow rate. Apparatus for effecting the controlled injection of binder and oil is provided.

---

This invention relates to a process and arrangement of apparatus for maintaining a relatively constant concentration of liquid binder in an aqueous stream of variable flow rate to a wet pelleting process, particularly, for carbon black pelleting. Another aspect of the invention relates to the control of the flow of hydrocarbon oil to a wet pelleting process.

In carbon black plants, it is conventional to wet pellet the flocculent carbon black after recovering same from a bag filter or other collecting device, in a wet-pelleting mill, such as a pug mill, by feeding separate streams of flocculent black and aqueous liquid to the mill or pelleter so that the pellets contain from about 40 to 60 weight percent water, preferably about 50 weight percent. U.S. Pat. 3,266,873, to Alleman discloses a wet pelleting technique in which the power utilized in turning the shaft of the pelleting mill is sensed and utilized to proportion the flow rates of flocculent black and aqueous liquid to the mill. In one embodiment of the disclosed and claimed process, the flow of black is maintained substantially constant and the sensed power is utilized to vary the flow rate of aqueous liquid to maintain the power relatively constant. As the power tends to rise, the flow rate of aqueous liquid is decreased and vice versa. Increasing the water concentration in the mixture in the pellet mill has the effect of increasing the power required to turn the mixing shaft in the mill.

In the wet pelleting of carbon black, it is common practice to incorporate a suitable binder in the aqueous liquid passing to the pelleter. Molasses and sodium silicate, both soluble in water, are frequently-used binding agents. These binders are incorporated in the pelleting water in an amount or concentration in the range of about 0.25 to 1.75 percent by weight. It is desirable to maintain close control of the concentration of the binder in the pelleting liquid in order to produce uniform pellets. Since there is inherently some variation in the flow of flocculent black to the pelleter, there must be some fluctuation in the flow rate of aqueous liquid thereto. Hence, in order to maintain a uniform concentration of binder in the aqueous liquid, it is necessary to vary the flow of binder as the flow of aqueous liquid varies. This problem of varying the flow rate of binder as the flow rate of aqueous liquid to the pelleter varies has not been completely overcome by prior art methods. This invention is concerned with a novel method and arrangement of apparatus for effecting such control. It is also common practice in the carbon black wet pelleting art to feed a minor stream of oil into the wet pelleter in order to prevent formation of carbon black scale on the walls of the pelleter. This invention is also concerned with a method and means of metering a stream of oil to the wet pelleter when wet pelleting flocculent carbon black.

Accordingly, it is an object of the invention to provide a novel method and arrangement of apparatus for effecting accurate control of the flow of a liquid binder into an aqueous stream passing to a wet pelleting carbon black process. Another object is to provide a method and means for regulating the injection of a stream of liquid binder into an aqueous stream of varying flow rate to maintain a relatively constant concentration of the binder in the aqueous stream. A further object is to provide a means and method of wet pelleting carbon black with aqueous liquids containing a liquid binder to produce pellets having uniform concentration of binder therein. An additional object is to provide means and method of injecting a hydrocarbon oil into a pelleting liquid in such a process so as to incorporate in the aqueous liquid a concentration of oil which is substantially constant. Other objects of the invention will become apparent to one skilled in the art upon consideration of the accompanying disclosure.

A broad aspect of the invention comprises incorporating in the liquid binder, such as molasses or sodium silicate (water glass), a minor concentration of a suitable electrolyte in a form of an acid or base to effect ionization and permit sensing the pH or hydrogen ion concentration in the aqueous liquid passing to the pelleting operation. Electrolyte is mixed with the pelleting liquid in a storage tank of substantial capacity to form a homogeneous mixture. The resulting mixture is pumped into a mixing zone thru which the aqueous liquid passes, utilizing a pump operated by an electric motor with a variable speed drive. The pH or hydrogen ion concentration in the resulting aqueous stream downstream of the mixing zone is sensed and the sensed value is utilized to vary the speed of the drive on the pump to maintain a constant pH or hydrogen ion concentration in the aqueous liquid stream which assures constant binder concentration in the aqueous liquid passing to the pelleting zone.

The oil stream injected into the aqueous liquid is controlled by sensing the flow rate of aqueous liquid in the line leading into the pellet mill and controlling a motor valve in the oil line in response to the sensed flow rate.

A more complete understanding of the invention may be had by reference to the accompanying schematic drawing which is a flow diagram of the process of the invention utilizing a preferred arrangement of apparatus.

Referring to the drawing, a pellet mill 10 in the form of an elongated horizontal cylinder, is provided with an axial shaft 12 extending thru the mill and provided with a spiral arrangement of stirring rods 14. Shaft 12 is operated by an electric motor 16 which turns the shaft at a substantially constant speed. Line 18 delivers a stream of aqueous pelleting liquid to the forward end of the pelleter under the control of a motor valve 20 positioned in the line. Carbon black feed line 22 also connects with the forward end of the mill and with a loose black surge tank 24 which is provided with an inlet line 26 and a variable feeder 28, such as a star valve. Feeder 28 is operated by a variable control power device 30 which operates shaft 32 connected with the feeder. Instrument 30 is a conventional device which has a set point 34 which controls the feeding rate of carbon black at a relatively constant rate in accordance with the set point of the instrument. However, there is some inherent variation in the flow rate of flocculent black thru line 22 into the pelleter and therefore necessity for varying the rate of flow of aqueous pelleting liquid thru line 18.

In order to control the flow rate of aqueous liquid in proportion to the slightly variable flow rate of loose black, a power recorder controller 36, having a set point 38 receives an electrical signal from transmitter 40 which is sensitive to the amperage flowing thru motor 16 and converts this to a pneumatic signal which operates motor valve 20 in line 18. As the concentration of water in pelleter 10 falls below the desired level, less power is required to turn shaft 12 and the amperage sensed by transmitter 40 decreases, thereby transmitting a signal to instrument 36 which demands greater flow of water in accordance with the set point of 38. A resulting pneumatic signal is then transmitted to motor valve 20 which increases the flow of water in line 18.

A mixer 41 is positioned at the upstream end of line 18 and a water line 42 connected with a pressure source and a line 44 for liquid binder feed into this mixer. Line 44 is provided with a suitable pump 46 the intake of which is connected with supply tank 48 for liquid binder to be introduced to the pelleting water. Line 50 for supplying liquid binder to tank 48 and line 52 for supplying a suitable electrolyte to the binder lead into the top of tank 48. When utilizing an acid as electrolyte, only sufficient electrolyte is added to the liquid binder in tank 48 to provide a pH reading in line 18 downstream of mixer 41 in the range of about 4 to 6, preferably, about 5. When utilizing a base as the electrolyte, sufficient base is mixed with the binder to provide a pH reading in the range of about 8 to 12, preferably, about 9.

The injection of binder-containing electrolyte thru line 44 into mixer 41 is controlled by means of a variable speed drive 54 on pump 46 which is operated by pH recorder controller 56 having a set point 58 which determines the pH to be maintained in the pelleting liquid. A pH sensing instrument 60 in line 18 senses the pH or hydrogen ion concentration in the pelleting liquid and the resulting signal is amplified by amplifier 62 which sends the amplified signal to instrument 56, thereby placing a demand on instrument 56, when the signal represents a variation from the set point 58, to change the speed of pump 46 and a return to the pH set point.

U.S. Pat. 3,102,941 to Hart et al. discloses a pH recorder controller arrangement of the above-described character which is operable in the apparatus and process of the invention.

An oil feed line 66 provided with motor valve 68 connects with water line 18 downstream of motor valve 20 for injecting oil into the aqueous pelleting liquid. An orifice 70 is positioned in line 18 upstream of motor valve 20 and transmitter 72 connects thereto, transmitting a flow rate signal to relay 74 which operates motor valve 68 to increase the flow thru line 66 and the motor valve as flow rate thru line 18 as measured by the instrumentation increases and vice versa. Relay 74 may be a biasing relay or a computer type relay both of which are conventional in the art.

The invention is not dependent upon the particular binder or electrolyte utilized in the process. While molasses and water glass are suggested as binders to be utilized, molasses being preferable, other binders may also be utilized. Also, any suitable electrolyte which gives a suitable pH reading when utilized in minor concentration may be used. Both mineral and organic acids including hydrochloric, nitric, sulfuric, acetic, citric, and similar acids are within the scope of the invention. Bases, including sodium hydroxide, potassium hydroxide, amines, and the like may be utilized. It is preferred to us an aqueous solution of these acids and bases to mix with the binder in supply tank 48.

Certain modifications of the invention will become apparent to those skilled in the art and the illustrative details disclosed are not to be construed as imposing unnecessary limitations on the invention.

I claim:

1. In a process for pelleting carbon black with water containing a minor but effective concentration of a fluid binder for said black wherein a stream of water and a stream of black are separately fed at controlled rates into an enclosed pelleting zone and there formed into pellets, said fluid binder being injected into said stream of water, the improvement comprising the steps of:
   a) adding an electrolyte to said binder before admixing same with said stream of water and forming a homogeneous mixture of said electrolyte and said binder;
   b) injecting the mixture of step (a) into said stream of water;
   c) sensing the pH or the hydrogen ion concentration of the stream resulting from step (b); and
   d) controlling the rate of injection in step (b) in response to the sensed value of step (c) to maintain said pH substantially constant at a selected standard value.

2. In the process of claim 1 wherein a minor but effective stream of oil is fed into said pelleting zone to prevent carbon scale build up on the walls of said pelleting zone, the further improvement comprising proportioning the rate of flow of said stream of oil in response to the rate of flow of said resulting stream of water and binder in step (d).

3. The improvement of claim 1 wherein the electrolyte of step (a) is an acid, said binder is molasses, and the rate of injection in step (d) is decreased as the sensed pH falls below said standard value and vice versa.

4. The improvement of claim 1 wherein the electrolyte in step (a) is a base, said binder is molasses, and the rate of injection in step (d) is increased as the sensed pH falls below said standard value and vice versa.

5. In an apparatus for controlling the flow of a stream of liquid agent into a variable stream of water in which a pressure water conduit is provided with a motor value for varying the flow rate of water therethrough, a conduit is connected with said water conduit and with a supply tank for a homogeneous mixture of said liquid agent and an electrolyte, a pump having a variable speed drive is positioned in said conduit connected with said water conduit and with said supply tank, and means is provided for sensing the pH of the liquid in said water line and for varying the variable speed drive means of said pump to maintain a substantially constant concentration of said liquid agent in said stream of water, the improvement comprising:
   a) a wet pelleter having an axial shaft provided with stirring means, a power operating means on said shaft, an inlet for water and an inlet for carbon black adjacent one end of said pelleter, and an outlet for wet pellets remote from said one end, said pressure water line being adapted to discharge into said pelleter;
   b) a carbon black feed line adapted to discharge into said pelleter, said feed line having flow control means positioned therein; and,
   c) means for sensing the power utilized by the power operating means of said pelleter and controlling relative flow rates of black and water in response to the sensed power to maintain said power relatively constant.

6. The apparatus of claim 5 wherein said power operating means of said pelleter is an electric motor, and said means for sensing the power utilized by the power operating means of said pelleter is in operative control of the motor valve in said pressure water line.

References Cited
UNITED STATES PATENTS

| | | | |
|---|---|---|---|
| 1,388,613 | 8/1921 | Simsohn | 324—30X |
| 2,209,487 | 7/1940 | Wagner | 210—24 |
| 2,782,151 | 2/1957 | Suthard | 204—1 |
| 3,277,218 | 10/1966 | Dollinger | 264—117X |
| 3,383,310 | 5/1968 | Ammer | 324—30X |

NORMAN YUDKOFF, Primary Examiner

R. T. FOSTER, Assistant Examiner

U.S. Cl. X.R.

137—5; 264—117; 324—30; 204—1